United States Patent
Ameling et al.

(10) Patent No.: US 10,965,569 B2
(45) Date of Patent: Mar. 30, 2021

(54) IOT MONITORING

(71) Applicant: SAP SE, Walldorf (DE)

(72) Inventors: Michael Ameling, Dresden (DE); Ralf Ackermann, Dresden (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/206,230

(22) Filed: Nov. 30, 2018

(65) Prior Publication Data

US 2020/0177484 A1    Jun. 4, 2020

(51) Int. Cl.
*H04W 4/00* (2018.01)
*H04L 12/26* (2006.01)
*H04W 24/10* (2009.01)
*H04W 4/70* (2018.01)
*H04W 24/08* (2009.01)

(52) U.S. Cl.
CPC ........ *H04L 43/0864* (2013.01); *H04L 43/106* (2013.01); *H04W 4/70* (2018.02); *H04W 24/08* (2013.01); *H04W 24/10* (2013.01)

(58) Field of Classification Search
CPC ............... H04L 43/0864; H04L 43/106; H04L 61/6063; H04W 4/70; H04W 24/081; H04W 24/10; H04W 72/0453; H04W 72/085
See application file for complete search history.

(56) References Cited

U.S. PATENT DOCUMENTS

| | | | |
|---|---|---|---|
| 8,046,326 B2 | 10/2011 | Ameling et al. | |
| 8,433,716 B2 | 4/2013 | Wolf et al. | |
| 8,749,499 B2 | 6/2014 | Ameling et al. | |
| 9,171,252 B2 | 10/2015 | Herzig et al. | |
| 9,630,109 B2 | 4/2017 | Herzig et al. | |
| 9,923,893 B2 | 3/2018 | Ameling et al. | |
| 2008/0291883 A1* | 11/2008 | Seok .................. | H04W 64/00 370/338 |
| 2013/0077659 A1* | 3/2013 | Okuda .................. | H04J 3/0667 375/219 |
| 2018/0091407 A1* | 3/2018 | Tervonen ............ | H04L 43/0852 |
| 2018/0309821 A1* | 10/2018 | Byers .................. | H04L 67/10 |
| 2019/0045475 A1* | 2/2019 | Kasichainula .... | H04W 56/0065 |
| 2019/0132204 A1* | 5/2019 | McGrath ............ | H04L 41/0654 |
| 2019/0141193 A1* | 5/2019 | Lee .................... | H04L 65/80 |
| 2019/0349426 A1* | 11/2019 | Smith .................. | H04L 67/104 |

* cited by examiner

*Primary Examiner* — Minh Trang T Nguyen
(74) *Attorney, Agent, or Firm* — Fish & Richardson P.C.

(57) ABSTRACT

The present disclosure involves systems, software, and computer implemented methods for Internet of Things (IoT) end-to-end continuous monitoring. In one example, a method may include transmitting a first message by a first device to a second device in an IoT cloud system, the first message including a first timestamp indicating when the first message is transmitted, receiving a second message by the first device from the second device, the second message including the first timestamp and a second timestamp indicating when the first message was received by the second device, the second message being received at a time indicated by a third timestamp, and monitoring by the first device end-to-end communication between the first device and the second device in the IoT cloud system based on at least one of the first, second, or third timestamps.

20 Claims, 3 Drawing Sheets

IOT MONITORING

TECHNICAL FIELD

The present disclosure relates to systems, software, and computer-implemented methods for Internet of Things (IoT) end-to-end monitoring.

Cloud services require continuous monitoring capabilities in order to check system health continuously. In IoT scenarios, that includes monitoring data ingestion and processing continuously.

SUMMARY

The present disclosure describes methods and systems, including computer-implemented methods, computer program products, and computer systems for Internet of Things (IoT) end-to-end continuous monitoring. One example computer-implemented method includes the following: transmitting a first message by a first device to a second device in an IoT cloud system, the first message including a first timestamp indicating when the first message is transmitted, receiving a second message by the first device from the second device, the second message including the first timestamp and a second timestamp indicating when the first message was received by the second device, the second message being received at a time indicated by a third timestamp, and monitoring by the first device end-to-end communication between the first device and the second device in the IoT cloud system based on at least one of the first, second, or third timestamps.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions being stored on the non-transitory, computer-readable medium.

The subject matter described in this specification can be implemented in particular implementations so as to realize one or more of the following advantages. First, the systems and/or methods described in the present disclosure can detect a delayed and/or undelivered message, determine end-to-end connection status, and/or determine correct message semantics after system updates or downtimes in an IoT cloud system. Second, the systems and/or methods described in the present disclosure can monitor end-to-end communication that includes integration of cloud applications and IoT clients. Thus, data processing and messaging can be monitored during runtime across all involved components and APIs during run-time. Delays or loss of messages can be quickly identified, and end-to-end functionality can be continuously ensured. In scenarios where message acknowledgment is required the end-to-end monitoring gets even more important since bi-directional communication comes into play. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
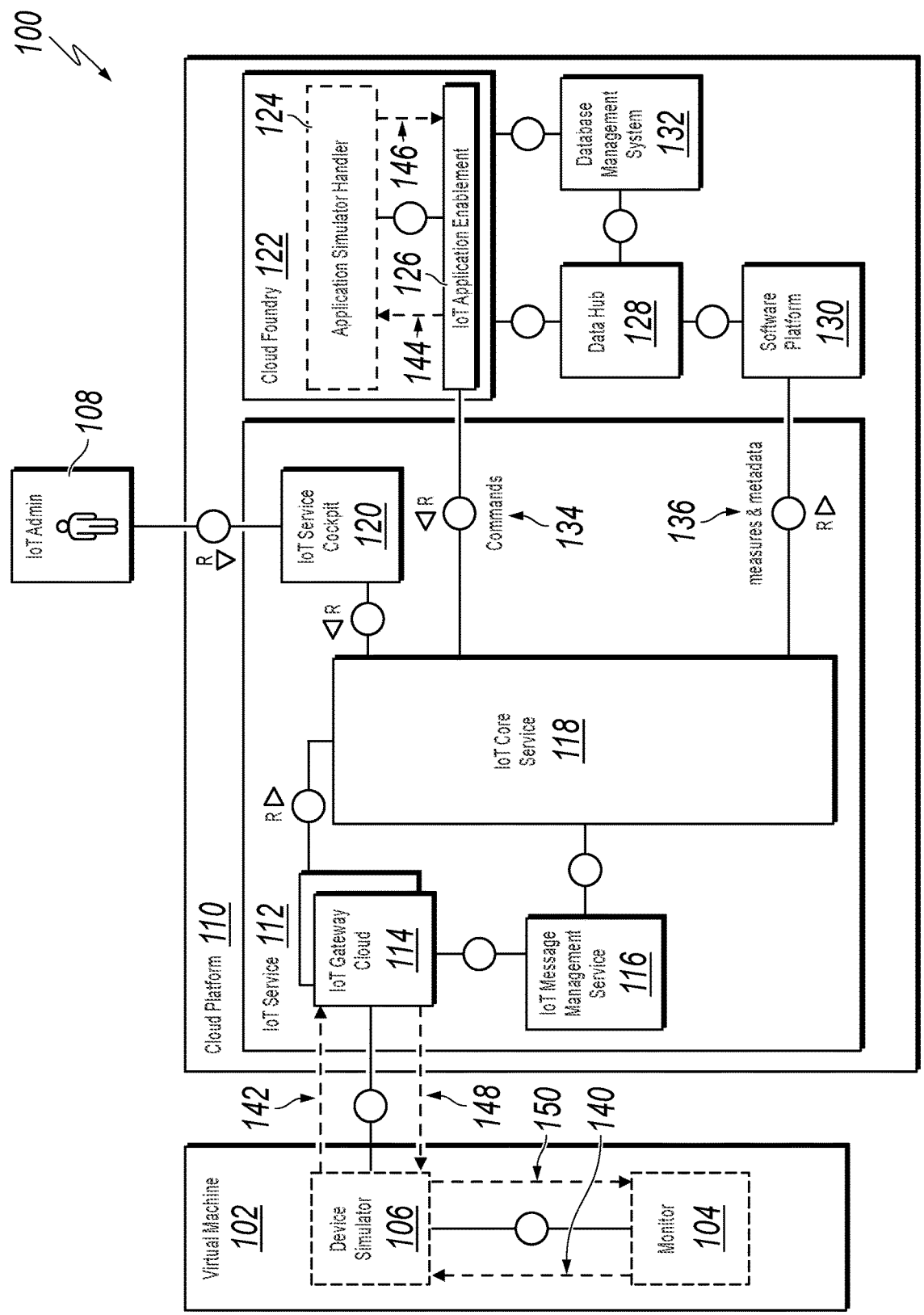
FIG. 1 is a block diagram illustrating an example system for IoT monitoring, according to an implementation.

The following detailed description describes IoT end-to-end monitoring. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Cloud services require continuous monitoring capabilities in order to check system health continuously. The monitoring includes, for example, security checks, performance testing, and error detection. Normally, the monitoring is performed by testing corresponding system components periodically (e.g., by invoking corresponding application program interfaces (APIs) at a predetermined time interval). However, API monitoring cannot detect a delayed message, or determine correct message semantics, for example, after system updates or downtimes in an IoT cloud system. In addition, API monitoring tests individual components separately, and may not consider end-to-end communication that includes integration of cloud applications and IoT clients in an IoT cloud system.

In an IoT cloud system, data ingestion and processing can be monitored continuously. For example, data sent from IoT devices to the cloud and/or data sent from the cloud to the IoT devices can be monitored continuously to ensure proper data processing and orchestration. In addition, data ingestion and processing can be monitored continuously to ensure that, during end-to-end communication, no data (e.g., messages) is delayed (e.g., buffered due to high traffic load), no data is manipulated (e.g., same data semantic and syntactic after system updates or downtimes), and/or connections (e.g., Message Queuing Telemetry Transport (MQTT)) are kept alive.

The IoT end-to-end monitoring can be performed using real data ingestion. For example, data can be sent continuously at equal time intervals. For bidirectional communication, data can be sent from IoT devices to the cloud and from the cloud to the IoT devices. By sending data periodically and observing the responsive data, end-to-end continuous monitoring can be achieved. In doing so, several Key Performance Indicators (KPIs) of end-to-end communication can be monitored in an IoT cloud system. The KPIs can include (1) data buffering (e.g., delay due to high traffic load), (2) connection status (e.g., IoT devices being connected during continuous data ingestion), and/or (3) correct data semantics after system updates or downtimes (e.g., IoT devices being able to ingest and/or receive data after system updates or downtimes the same way as before system updates or downtimes), among others. For example, high traffic loads in an IoT cloud system can cause data buffering at one or more IoT cloud components due to limited processing capabilities of the one or more IoT cloud components. Data that cannot be processed at the time it was received will be buffered for later processing. In other words the data will be delayed. A very critical situation comes up when data is queued and the queue cannot be reduced due to high traffic load. To monitor data buffering, data or messages can be time stamped, for example, by end components. As a result, an end-to-end delay can be dynamically calculated, such as by comparing the calculated end-to-end delay with a predetermined threshold (e.g., a normal or expected delay due to network latency and processing times). Using the solution described herein, data buffering during end-to-end communication can be monitored so that issues are detected quickly and more efficiently than current solutions.

Turning to the illustrated embodiment, FIG. 1 is a block diagram illustrating an example system 100 for IoT monitoring, according to an implementation. Specifically, the illustrated system 100 includes a virtual machine 102, a cloud platform 110, and an IoT administrator 108. In operation, the virtual machine 102 (e.g., a special software that has assigned hardware resources) receives commands from the cloud platform 110, and returns measures to the cloud platform 110. In some implementations, the virtual machine 102 sends data (e.g., measures and metadata) to the cloud platform 110 periodically, and receives responsive data (e.g., commands) from the cloud platform 110.

Although components in FIG. 1 are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate. In some implementations, the system 100 may include additional and/or different components not shown in the block diagram, such as one or more edge devices, an IoT gateway edge, another type of cloud platform, or a combination of these and other technologies. In some implementations, components may also be omitted from the system 100.

As used in the present disclosure, the term "computer" is intended to encompass any suitable processing device. For example, an IoT device may be any computer or processing device such as, for example, a blade server, general-purpose personal computer (PC), Mac®, workstation, UNIX-based workstation, or any other suitable device. Moreover, the present disclosure contemplates computers other than general-purpose computers, as well as computers without conventional operating systems. Further, illustrated virtual machine 102 and edge devices (not shown) in the system 100 may each be adapted to execute any operating system, including Linux, UNIX, Windows, Mac OS®, Java™, Android™, or iOS. According to one implementation, the illustrated systems may also include, or be communicably coupled with, a communication server, an e-mail server, a web server, a caching server, a streaming data server, and/or other suitable server or computer.

As illustrated in FIG. 1, the virtual machine 102 includes a monitor 104 and a device simulator 106. The illustrated monitor 104 is used to monitor end-to-end communication of the system 100 continuously. For example, the monitor 104 can be a health check monitor that checks the system 100 periodically. The illustrated device simulator 106 is simulating an IoT device associated with the IoT service, and is used to perform the monitoring operations without modifying the operations of a physical device. In other words the simulator is producing continuously IoT data such as sensor values. The device simulator 106 can transmit a message to the cloud platform 110 when instructed by the monitor 104, receive a responsive message from the cloud platform 110, and report to the monitor 104. Although illustrated as the monitor 104 and the device simulator 106 running on the virtual machine 102 in FIG. 1, a physical device (e.g., an IoT device) or a software simulator running on any isolated hardware machine may be used according to particular needs, desires, or particular implementations of the system 100. Specifically, the virtual machine 102 executes the algorithms and operations described in the illustrated figures, including the operations performing the functionality associated with the virtual machine 102 generally, as well as the various software modules, including the functionality for sending communications to and receiving transmissions from the cloud platform 110.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, the cloud platform 110 includes an IoT service 112, a Cloud Foundry (CF) 122, a data hub 128, a software platform 130, and a database management system 132. The IoT service 112 is used by the cloud platform 110 to provide service to IoT devices (e.g., providing a solution for collecting, processing, analyzing, and visualizing IoT data in real time). The IoT service 112 includes an IoT gateway cloud 114, an IoT message management service 116, an IoT core service 118, and an IoT service cockpit 120. The IoT gateway cloud 114 acts as a communication bridge between IoT clients and cloud applications. In operation, the IoT gateway cloud 114 routes messages between IoT clients and cloud applications. For example, when receiving messages associated with end-to-end monitoring from the device simulator 106, the IoT gateway cloud 114 can route the messages to the application simulator handler 124. The IoT message management service 116 manages messages transmitted in the IoT service 112. The IoT core service 118 is a fully managed service that connects, manages, and ingests data from numerous IoT devices. The IoT service cockpit 120 provides services to developers (e.g., the IoT administrator 108) to on-board devices, and can be used to configure events (e.g., alarms) in the cloud platform 110.

As illustrated in FIG. 1, the CF 122 includes an application simulator handler 124 and an IoT application enablement 126. The CF 122 is an open source, multi-cloud application platform as a service (PaaS) governed by the Cloud Foundry Foundation. Any other suitable cloud platform 110 and/or components may be used in other implementations. The illustrated application simulator handler 124 is used by the CF 122 to handle messages associated with end-to-end monitoring. In operation, the application simulator handler 124 issues commands to IoT devices periodically or at selected dates, and receives messages from the IoT devices. In some cases, the application simulator handler 124 can receive the message transmitted by the device simulator 106, and return a responsive message back to the device simulator 106. The IoT application enablement 126 represents a network of physical objects (known as "things"), and includes a collection of REST-based and/or OData-based services to store and retrieve data. For example, the IoT application enablement 126 can transmit commands 134 to the IoT core service 118 to retrieve data from IoT devices.

The data hub 128 is used to integrate, orchestrate, manage, share, and distribute data in the cloud platform 110. The software platform 130 (e.g., KAFKA) is used to provide a unified, high-throughput, and low-latency platform for handling real-time data feeds. For example, the IoT core service 118 can transmit measures and metadata 136 to the software platform 130 for handling. The database management system 132 (e.g., SAP HANA) is used to store and retrieve data as requested by cloud applications.

In an exemplary operation, as shown by 140, the monitor 104 instructs the device simulator 106 to transmit a message to perform a status or health check on end-to-end communication (e.g., issue a roundtrip communication between the device simulator 106 and the application simulator handler 124). The monitor 104 can send instructions to the device simulator periodically (e.g., every 30 seconds) or when determining a status or health check is desired.

As shown by 142, after receiving the instruction from the monitor 104, the device simulator 106 transmits a message to a corresponding IoT cloud solution in the cloud platform 110 (i.e., the application simulator handler 124 who invokes data from the virtual machine 102). The message can be a regular message (e.g., a message to report measures and metadata) or a special message (e.g., a message specifically used for monitoring end-to-end communication). The device simulator 106 can transmit the message to the cloud platform 110 via a regular application program interface (API) (e.g., a general-purpose API interfacing with the cloud platform 110) or a special API (e.g., a dedicated API for monitoring end-to-end communication). For example, when transmitted via the regular API, the device simulator 106 can apply a unique identifier to the message (e.g., write the unique identifier into a payload or header of the message). The unique identifier indicates that the message is used for monitoring end-to-end communication. Based on the unique identifier, the cloud platform 110 can process the message, determine that the message is for monitoring end-to-end communication, and forward the message to the appropriate destination. When transmitted via the special API, the cloud platform 110 can process the message, determine that the message is for monitoring end-to-end communication, and forward the message to the appropriate destination. The device simulator 106 can apply a first timestamp $T_1$ to the message (e.g., write $T_1$ into a payload or header of the message). The first timestamp $T_1$ indicates when the message is transmitted by the device simulator 106 to the cloud platform 110.

As shown by 144, the application simulator handler 124 receives the message from the device simulator 106 via the IoT application enablement 126. The message is received by the application simulator handler 124 at a time indicated by a second timestamp $T_2$. From the received message, the application simulator handler 124 can obtain the first timestamp $T_1$.

As shown by 146, in response to receiving the message from the device simulator 106, the application simulator handler 124 transmits a responsive message (e.g., a command) to the device simulator 106. The application simulator handler 124 can apply both the first timestamp $T_1$ and the second timestamp $T_2$ to the responsive message (e.g., write $T_1$ and $T_2$ into a payload or header of the responsive message).

As shown by 148, the device simulator 106 receives the responsive message from the cloud platform 110. The responsive message is received by the device simulator 106 at a time indicated by a third timestamp $T_3$. From the responsive message, the device simulator 106 can obtain the first timestamp $T_1$ and the second timestamp $T_2$.

As shown by 150, the device simulator 106 evaluates obtained timestamps (e.g., $T_1$, $T_2$, and/or $T_3$). Based on the evaluation, the device simulator 106 can report to the monitor 104 status or health of the end-to-end communication (e.g., whether the end-to-end communication is connected, or whether the end-to-end communication works correctly). For example, by evaluating $T_1$ and $T_2$, a determination can be made as to whether the message is delayed (e.g., buffered) during a transmission from the device simulator 106 to the application simulator handler 124. By evaluating $T_1$ and $T_3$, a determination can be made as to whether there is a delay during a roundtrip transmission between the device simulator 106 and the application simulator handler 124.

In the above exemplary operation, time synchronization among different components of the system 100 is assumed. For example, time on the device simulator 106 and the application simulator handler 124 are synchronized. In addition, the operation is independent from transmission protocol (e.g., MQTT or Hypertext Transfer Protocol (HTTP)), so that different communication channels can be monitored. In some cases, additional timestamps can be included in the message and/or the responsive message (e.g., timestamps indicating when the message and/or the responsive message was received and/or transmitted by the IoT gateway cloud 114). With the additional timestamps, instead of simply determining a delay on the whole end-to-end communication path, part of the end-to-end communication path that causes the delay can be identified. In some implementations, a message is transmitted by the application simulator handler 124, and the device simulator 106 returns a responsive message to the cloud platform 110.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Figure 2:
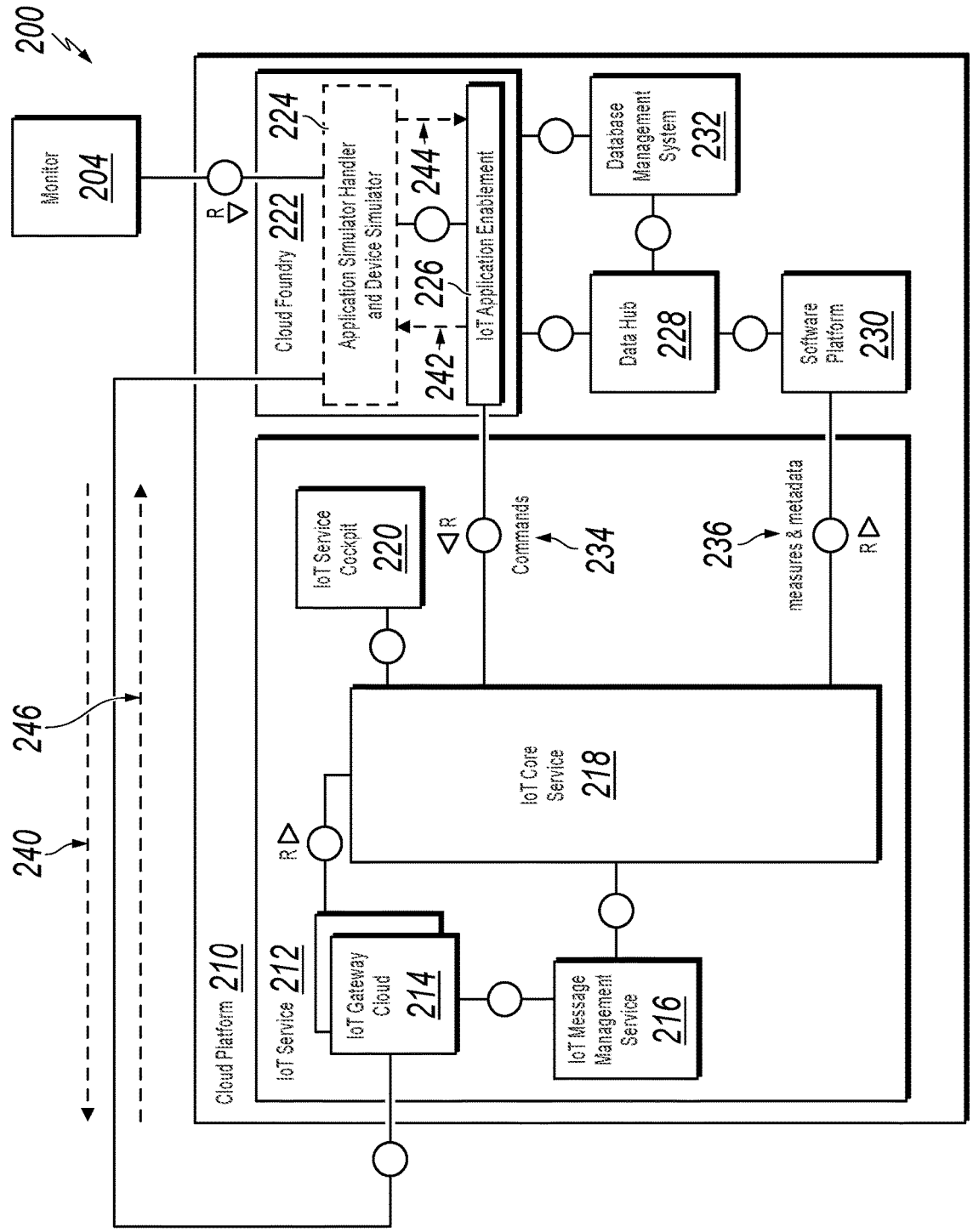
FIG. 2 is a block diagram illustrating another example system for IoT monitoring, according to an implementation.

FIG. 2 is a block diagram illustrating another example system 200 for IoT monitoring, according to an implementation. Specifically, the illustrated system 200 includes a monitor 204 and a cloud platform 210. In operation, the monitor 204 monitors end-to-end communication of the system 200 continuously. For example, the monitor 204 can be a health check monitor that checks the system 200 periodically. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate. In some implementations, the system 200 may include additional and/or different components not shown in the block diagram, such as one or more edge devices, an IoT Gateway edge, another type of cloud platform, or a combination of these and other technologies. In some implementations, components may also be omitted from the system 200.

As illustrated, the cloud platform 210 includes an IoT service 212, a Cloud Foundry (CF) 222, a data hub 228, a software platform 230, and a database management system 232. The IoT service 212 is used by the cloud platform 210 to provide service to IoT devices (e.g., providing a solution for collecting, processing, analyzing, and visualizing IoT data in real time). The IoT service 212 includes an IoT gateway cloud 214, an IoT message management service 216, an IoT core service 218, and an IoT service cockpit 220. The IoT gateway cloud 214 can be similar to the IoT gateway cloud 114 in FIG. 1. The IoT message management service 216 can be similar to the IoT message management service 116 in FIG. 1. The IoT core service 218 can be similar to the IoT core service 118 in FIG. 1. The IoT service cockpit 220 can be similar to the IoT service cockpit 120 in FIG. 1.

As illustrated in FIG. 2, the CF 222 includes an application simulator handler and device simulator 224 and an IoT application enablement 226. The CF 222 can be similar to the CF 122 in FIG. 1. The illustrated application simulator handler and device simulator 224 is used by the CF 222 to handle messages associated with end-to-end monitoring. The application simulator handler and device simulator 224 integrates the device simulator 106 and the application simulator handler 124 in FIG. 1 into a single CF Application (e.g., in a same cloud foundry container environment). In operation, the application simulator handler and device simulator 224 issues commands to the IoT service 212 periodically, and receives messages from the IoT service 212. In some cases, the application simulator handler and device simulator 224 can receive an instruction from the monitor 204 to transmit a message to the IoT service 212, and receive a responsive message back from the IoT service 212. The IoT application enablement 226 can be similar to the IoT application enablement 126 in FIG. 1. For example, the IoT application enablement 226 can transmit commands 234 to the IoT core service 218 to retrieve data from IoT devices.

The data hub 228 can be similar to the data hub 128 in FIG. 1. The software platform 230 can be similar to the software platform 130 in FIG. 1. For example, the IoT core service 218 can transmit measures and metadata 236 to the software platform 230 for handling. The database management system 232 can be similar to the database management system 132 in FIG. 1.

In an exemplary operation, as shown by 240, the application simulator handler and device simulator 224 transmits a message to a corresponding IoT cloud solution in the cloud platform 210 via the IoT service 212. For example, the application simulator handler and device simulator 224 can have separated threads, one thread for the device simulator (similar to the device simulator 106 in FIG. 1) and another thread for the application simulator handler (similar to the application simulator handler 124 in FIG. 1). The application simulator handler and device simulator 224 can transmit a message periodically (e.g., every 30 seconds), or when instructed by the monitor 204. The message can be a regular message (e.g., a message to report measures and metadata) or a special message (e.g., a message specifically used for monitoring end-to-end communication). The application simulator handler and device simulator 224 can transmit the message to the IoT service 212 via a regular application program interface (API) (e.g., a general-purpose API interfacing with the IoT service) or a special API (e.g., a dedicated API for monitoring end-to-end communication). For example, when transmitted via the regular API, the application simulator handler and device simulator 224 can apply a unique identifier to the message (e.g., write the unique identifier into a payload or header of the message). The unique identifier indicates that the message is used for monitoring end-to-end communication. Based on the unique identifier, the IoT service 212 can process the message, determine that the message is for monitoring end-to-end communication, and forward the message to the appropriate destination. When transmitted via the special API, the IoT service 212 can process the message, determine that the message is for monitoring end-to-end communication, and forward the message to the appropriate destination. The application simulator handler and device simulator 224 can apply a first timestamp $T_1$ to the message (e.g., write $T_1$ into a payload or header of the message). The first timestamp $T_1$ indicates when the message is transmitted by the application simulator handler and device simulator 224 to the IoT service 212.

As shown by 242, the application simulator handler and device simulator 224 receives the message via the IoT application enablement 226. The message is received by the application simulator handler and device simulator 224 at a time indicated by a second timestamp $T_2$. From the received message, the application simulator handler and device simulator 224 can obtain the first timestamp $T_1$.

As shown by 244, in response to receiving the message via the IoT application enablement 226, the application simulator handler and device simulator 224 transmits a responsive message (e.g., a command) via the IoT application enablement 226. The application simulator handler and device simulator 224 can apply both the first timestamp $T_1$ and the second timestamp $T_2$ to the responsive message (e.g., write $T_1$ and $T_2$ into a payload or header of the responsive message).

As shown by 246, the application simulator handler and device simulator 224 receives the responsive message via the IoT service 212. The responsive message is received by the application simulator handler and device simulator 224 at a time indicated by a third timestamp $T_3$. From the responsive message, the application simulator handler and device simulator 224 can obtain the first timestamp $T_1$ and the second timestamp $T_2$. The application simulator handler and device simulator 224 can evaluate obtained timestamps (e.g., $T_1$, $T_2$, and/or $T_3$). Based on the evaluation, the application simulator handler and device simulator 224 can report, for example, to the monitor 204 status or health of the end-to-end communication (e.g., whether the end-to-end communication is connected, or whether the end-to-end communication works correctly). For example, by evaluating $T_1$ and $T_3$, a determination can be made as to whether there is a delay during a roundtrip end-to-end communication.

In the above exemplary operation, time synchronization among different components of the system 200 is assumed. In addition, the operation is independent from transmission protocol (e.g., MQTT or HTTP), so that different communication channels can be monitored. In some cases, additional timestamps can be included in the message and/or the responsive message (e.g., timestamps indicating when the message and/or the responsive message were received and/or transmitted by the IoT gateway cloud 214). With the additional timestamps, instead of simply determining a delay on the whole end-to-end communication path, part of the end-to-end communication path that causes the delay can be identified. In some implementations, a message is transmitted by the application simulator handler and device simulator 224 via the IoT application enablement 226, and a responsive message is received by the application simulator handler and device simulator 224 via the IoT service 212.

While portions of the software elements illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Figure 3:
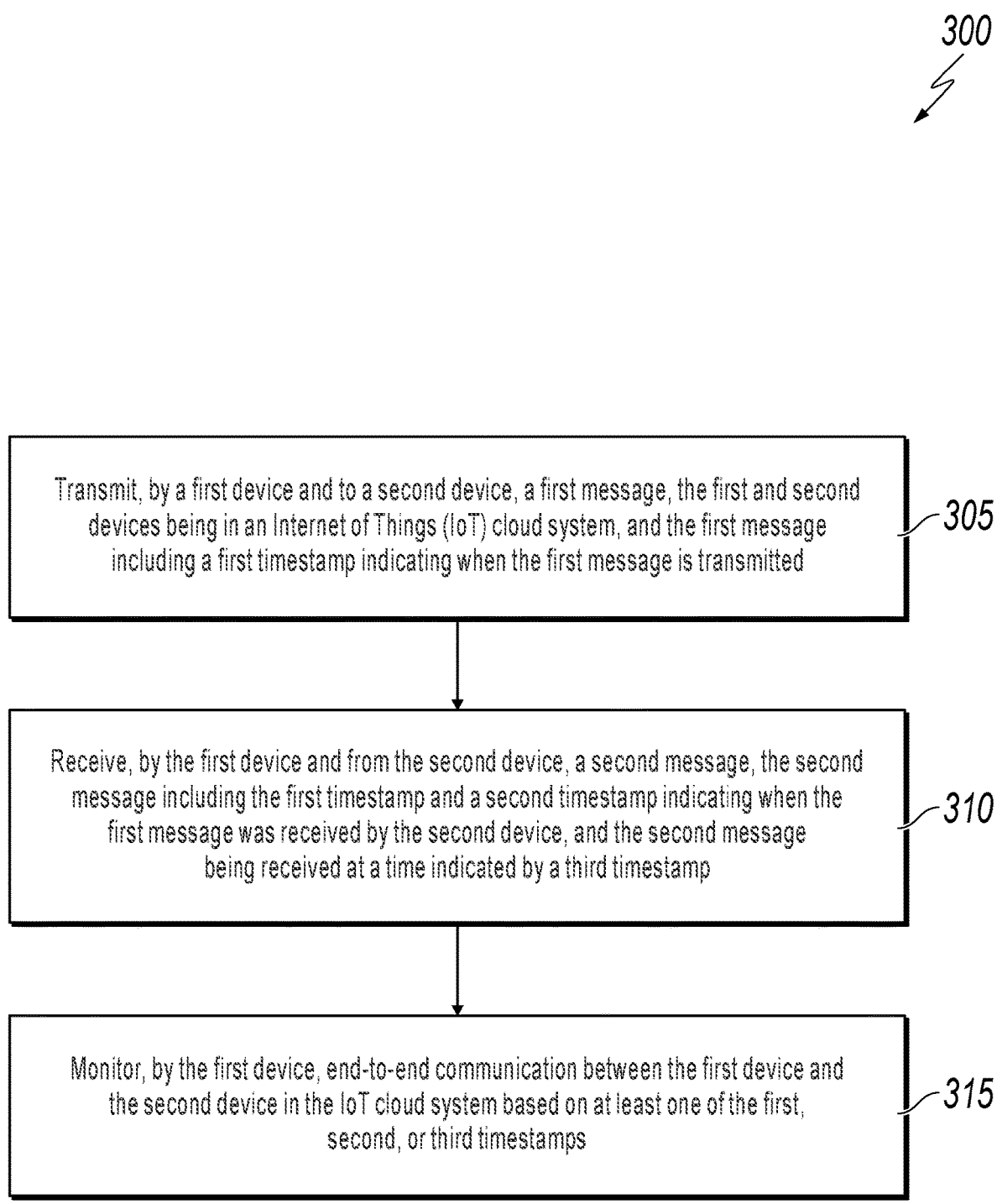
FIG. 3 is a flowchart of an example method for IoT monitoring, according to an implementation.

FIG. 3 is a flowchart of an example method 300 for IoT monitoring, according to an implementation. It will be understood that method 300 and related methods may be performed, for example, by any suitable system, environment, software, and hardware, or a combination of systems, environments, software, and hardware, as appropriate. For example, an edge device or other suitable computing device can be used to execute method 300 and related methods. In some implementations, the method 300 and related methods are executed by one or more components of the system 100 and/or the system 200 described above with respect to FIGS. 1 and 2. For example, the method 300 and related methods can be executed by the device simulator 106 of FIG. 1 and/or the application simulator handler and device simulator 224 of FIG. 2.

At 305, a first message is transmitted by a first device to a second device. The first message can include a first timestamp $T_1$ indicating when the first message is transmitted. In some implementations, the first device can apply the first timestamp $T_1$ to the first message. The first and second devices can be in an IoT cloud system. For example, the first device can be an IoT device or a device simulator (e.g., the device simulator 106 of FIG. 1), and the second device can be an IoT cloud application (e.g., the application simulator handler 124 of FIG. 2). In some cases, the first device can be an IoT cloud application (e.g., the application simulator handler 124 of FIG. 2), and the second device can be an IoT device or a device simulator (e.g., the device simulator 106 of FIG. 1). In some implementations, the first device and the second device can be co-located in a Cloud Foundry (CF) application (e.g., the application simulator handler and device simulator 224 of FIG. 2).

In some implementations, the transmission can be performed periodically (e.g., a message can be transmitted every 30 seconds). In some cases, the transmission can be triggered, for example, by the monitor 104 of FIG. 1 when a status or health check of the IoT cloud system is desired. The first message can be a regular message (e.g., a message to report measures and metadata of an edge device) or a special message (e.g., a message used for monitoring end-to-end communication). The first message can be transmitted via a regular application program interface (API) (e.g., a general-purpose API) or a special API (e.g., a dedicated API for monitoring end-to-end communication). For example, when transmitted via the regular API, the first message can include a unique identifier indicating that the first message is used for monitoring end-to-end communication. Based on the unique identifier, the first message can be routed to the second device. When the first message is sent via a special API, handling of first message may be based off receiving the first message via the special API, and the first message can be routed to the second device based on the location of receipt.

At 310, a second message is received by the first device from the second device. In some implementations, the second message can be a responsive message to the first message (e.g., a command message). For example, the second device can automatically transmit the second message to the first device in response to receiving the first message from the first device. The second message can include the first timestamp $T_1$ and a second timestamp $T_2$. The second timestamp $T_2$ can indicate when the first message was received by the second device. In some implementations, the second device can obtain the first timestamp $T_1$ from the first message, and apply the first timestamp $T_1$ and the second timestamp $T_2$ to the second message. In some implementations, the second message is received by the first device at a time indicated by a third timestamp $T_3$. In some cases, the second message can include additional timestamps indicating when the first message and/or the second message was received and/or transmitted by one or more intermediary devices on an end-to-end communication path between the first and second devices (e.g., the IoT gateway cloud 114 of FIG. 1). In some implementations, if the first message includes a unique identifier, the second message can include the same unique identifier applied, for example, by the second device.

At 315, end-to-end communication between the first device and the second device in the IoT cloud system is monitored by the first device based on at least one of the first, second, or third timestamps. In some implementations, monitoring the end-to-end communication includes at least one of detecting message buffering, determining connection status, or determining correct message semantics after system updates or downtimes during the end-to-end communication. By transmitting messages and receiving responsive messages periodically, end-to-end continuous monitoring in an IoT cloud system can be achieved.

For example, after receiving the second message, the first device can calculate round-trip time (RTT) for the end-to-end communication based on a time difference between the third timestamp $T_3$ and the first timestamp $T_1$ (i.e., $T_3-T_1$). The calculated RTT can be compared with a predetermined threshold. The predetermined threshold can be set, for example, by the IoT administrator 108 in FIG. 1. In some implementations, the predetermined threshold can be set as a normal transmission and processing delay due to normal network latency and processing times (e.g., 500 milliseconds). In response to a determination that the RTT is greater than the predetermined threshold, a detection can be made that at least one of the first message or the second message is delayed during the end-to-end communication. For example, one or more IoT cloud components cannot process a message at the time the message was received due to limited processing capabilities and high traffic load. As a result, the message will be buffered for later processing and/or transmission at the one or more IoT cloud components, and the RTT of the message will be increased.

In some implementations, the first device can calculate $T_2-T_1$ to determine whether the first message is delayed when transmitted from the first device to the second device. In some cases, the second device can calculate $T_2-T_1$ to determine whether the first message is delayed when transmitted from the first device to the second device. In some implementations, if the first message and/or the second message include additional timestamps applied by, for example, one or more intermediary devices, status of part of the end-to-end communication path (e.g., from the first device to an intermediary device) can be monitored. As a result, where system anomaly occurred in the IoT cloud system and/or what causes the system anomaly can be identified.

The example method 300 shown in FIG. 3 can be modified or reconfigured to include additional, fewer, or different actions (not shown in FIG. 3), which can be performed in the order shown or in a different order. For example, after 315, if a system anomaly is detected, the first device can alert the IoT cloud system so that the IoT cloud system can take actions to deal with the system anomaly. In some implementations, one or more of the actions shown in FIG. 3 can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action. In some implementations, one or more of the individual actions shown in FIG. 3 may also be omitted from the example method 300.

Alternative methods of IoT monitoring may be used in other implementations. Those described herein are examples and are not meant to be limiting.

Described implementations of the subject matter can include one or more features, alone or in combination.

For example, in a first implementation, a computer-implemented method includes transmitting, by a first device and to a second device, a first message, wherein the first and second devices are in an Internet of Things (IoT) cloud system, and wherein the first message includes a first timestamp indicating when the first message is transmitted; receiving, by the first device and from the second device, a second message, wherein the second message includes the first timestamp and a second timestamp indicating when the first message was received by the second device, and wherein the second message is received at a time indicated by a third timestamp; and monitoring, by the first device, end-to-end communication between the first device and the second device in the IoT cloud system based on at least one of the first, second, or third timestamps.

The foregoing and other described implementations can each optionally include one or more of the following features:

A first feature, combinable with any of the following features, wherein monitoring the end-to-end communication includes: calculating round-trip time (RTT) for the end-to-end communication based on a time difference between the third timestamp and the first timestamp; comparing the RTT with a predetermined threshold; and in response to determining that the RTT is greater than the predetermined threshold, detecting that at least one of the first message or the second message is delayed during the end-to-end communication.

A second feature, combinable with any of the previous or following features, wherein the second device applies the first timestamp and the second timestamp to the second message.

A third feature, combinable with any of the previous or following features, wherein the transmission is performed periodically by the first device.

A fourth feature, combinable with any of the previous or following features, wherein the first device is an IoT device or a device simulator, the second device is an IoT cloud application, the first message is a measurement message, and the second message is a command message.

A fifth feature, combinable with any of the previous or following features, wherein the first device is an IoT cloud application, and the second device is an IoT device or a device simulator.

A sixth feature, combinable with any of the previous or following features, wherein the first device and the second device are located in a Cloud Foundry (CF) application.

A seventh feature, combinable with any of the previous or following features, wherein monitoring the end-to-end communication includes at least one of detecting message buffering, determining connection status, or determining correct message semantics after system updates or downtimes.

An eighth feature, combinable with any of the previous or following features, wherein the first message includes a unique identifier indicating that the first message is used for monitoring the end-to-end communication.

In a second implementation, a non-transitory computer storage medium encoded with a computer program, the program comprising instructions that, when executed by one or more computers, cause the one or more computers to perform operations comprising: transmitting, by a first device and to a second device, a first message, wherein the first and second devices are in an Internet of Things (IoT) cloud system, and wherein the first message includes a first timestamp indicating when the first message is transmitted; receiving, by the first device and from the second device, a second message, wherein the second message includes the first timestamp and a second timestamp indicating when the first message was received by the second device, and wherein the second message is received at a time indicated by a third timestamp; and monitoring, by the first device, end-to-end communication between the first device and the second device in the IoT cloud system based on at least one of the first, second, or third timestamps.

The foregoing and other described implementations can each optionally include one or more of the following features:

A first feature, combinable with any of the following features, wherein monitoring the end-to-end communication includes: calculating round-trip time (RTT) for the end-to-end communication based on a time difference between the third timestamp and the first timestamp; comparing the RTT with a predetermined threshold; and in response to determining that the RTT is greater than the predetermined threshold, detecting that at least one of the first message or the second message is delayed during the end-to-end communication.

A second feature, combinable with any of the previous or following features, wherein the second device applies the first timestamp and the second timestamp to the second message.

A third feature, combinable with any of the previous or following features, wherein the transmission is performed periodically by the first device.

A fourth feature, combinable with any of the previous or following features, wherein the first device is an IoT device or a device simulator, the second device is an IoT cloud application, the first message is a measurement message, and the second message is a command message.

A fifth feature, combinable with any of the previous or following features, wherein the first device is an IoT cloud application, and the second device is an IoT device or a device simulator.

A sixth feature, combinable with any of the previous or following features, wherein the first device and the second device are located in a Cloud Foundry (CF) application.

A seventh feature, combinable with any of the previous or following features, wherein monitoring the end-to-end communication includes at least one of detecting message buffering, determining connection status, or determining correct message semantics after system updates or downtimes.

An eighth feature, combinable with any of the previous or following features, wherein the first message includes a unique identifier indicating that the first message is used for monitoring the end-to-end communication.

In some implementations, the computer program product can be implemented on a non-transitory, computer-readable medium storing one or more instructions executable by a computer system to perform the above-described operations.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: transmitting, by a first device and to a second device, a first message, wherein the first and second devices are in an Internet of Things (IoT) cloud system, and wherein the first message includes a first timestamp indicating when the first message is transmitted; receiving, by the first device and from the second device, a second message, wherein the second message includes the first timestamp and a second timestamp indicating when the first message was received by the second device, and wherein the second message is received at a time indicated by a third timestamp; and monitoring, by the first device, end-to-end communication between the first device and the second device in the IoT cloud system based on at least one of the first, second, or third timestamps.

The foregoing and other described implementations can each optionally include one or more of the following features:

A first feature, combinable with any of the following features, wherein monitoring the end-to-end communication includes: calculating round-trip time (RTT) for the end-to-end communication based on a time difference between the third timestamp and the first timestamp; comparing the RTT with a predetermined threshold; and in response to determining that the RTT is greater than the predetermined threshold, detecting that at least one of the first message or the second message is delayed during the end-to-end communication.

A second feature, combinable with any of the previous or following features, wherein the second device applies the first timestamp and the second timestamp to the second message.

A third feature, combinable with any of the previous or following features, wherein the transmission is performed periodically by the first device.

A fourth feature, combinable with any of the previous or following features, wherein the first device is an IoT device or a device simulator, the second device is an IoT cloud application, the first message is a measurement message, and the second message is a command message.

A fifth feature, combinable with any of the previous or following features, wherein the first device is an IoT cloud application, and the second device is an IoT device or a device simulator.

A sixth feature, combinable with any of the previous or following features, wherein the first device and the second device are located in a Cloud Foundry (CF) application.

A seventh feature, combinable with any of the previous or following features, wherein monitoring the end-to-end communication includes at least one of detecting message buffering, determining connection status, or determining correct message semantics after system updates or downtimes.

An eighth feature, combinable with any of the previous or following features, wherein the first message includes a unique identifier indicating that the first message is used for monitoring the end-to-end communication.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    transmitting, by a first device and to a second device, a first message, wherein the first and second devices are in an Internet of Things (IoT) cloud system, and wherein the first message includes a first timestamp indicating when the first message is transmitted;
    receiving, by the first device and from the second device, a second message, wherein the second message includes the first timestamp and a second timestamp indicating when the first message was received by the second device, and wherein the second message is received at a time indicated by a third timestamp; and
    monitoring, by the first device, end-to-end communication between the first device and the second device in the IoT cloud system based on at least one of the first, second, or third timestamps.

2. The method of claim 1, wherein monitoring the end-to-end communication includes:
    calculating round-trip time (RTT) for the end-to-end communication based on a time difference between the third timestamp and the first timestamp;
    comparing the RTT with a predetermined threshold; and
    in response to determining that the RTT is greater than the predetermined threshold, detecting that at least one of the first message or the second message is delayed during the end-to-end communication.

3. The method of claim 1, wherein the second device applies the first timestamp and the second timestamp to the second message.

4. The method of claim 1, wherein the transmission is performed periodically by the first device.

5. The method of claim 1, wherein the first device is an IoT device or a device simulator, the second device is an IoT cloud application, the first message is a measurement message, and the second message is a command message.

6. The method of claim 1, wherein the first device is an IoT cloud application, and the second device is an IoT device or a device simulator.

7. The method of claim 1, wherein the first device and the second device are located in a Cloud Foundry (CF) application.

8. The method of claim 1, wherein monitoring the end-to-end communication includes at least one of detecting message buffering, determining connection status, or determining correct message semantics after system updates or downtimes.

9. The method of claim 1, wherein the first message includes a unique identifier indicating that the first message is used for monitoring the end-to-end communication.

10. A non-transitory computer storage medium encoded with a computer program, the program comprising instructions that, when executed by one or more computers, cause the one or more computers to perform operations comprising:
    transmitting, by a first device and to a second device, a first message, wherein the first and second devices are in an Internet of Things (IoT) cloud system, and wherein the first message includes a first timestamp indicating when the first message is transmitted;
    receiving, by the first device and from the second device, a second message, wherein the second message includes the first timestamp and a second timestamp indicating when the first message was received by the second device, and wherein the second message is received at a time indicated by a third timestamp; and
    monitoring, by the first device, end-to-end communication between the first device and the second device in the IoT cloud system based on at least one of the first, second, or third timestamps.

11. The medium of claim 10, wherein monitoring the end-to-end communication includes:

calculating round-trip time (RTT) for the end-to-end communication based on a time difference between the third timestamp and the first timestamp;

comparing the RTT with a predetermined threshold; and in response to determining that the RTT is greater than the predetermined threshold, detecting that at least one of the first message or the second message is delayed during the end-to-end communication.

12. The medium of claim 10, wherein the second device applies the first timestamp and the second timestamp to the second message.

13. The medium of claim 10, wherein the transmission is performed periodically by the first device.

14. The medium of claim 10, wherein the first device is an IoT device or a device simulator, the second device is an IoT cloud application, the first message is a measurement message, and the second message is a command message.

15. The medium of claim 10, wherein the first device is an IoT cloud application, and the second device is an IoT device or a device simulator.

16. The medium of claim 10, wherein the first device and the second device are located in a Cloud Foundry (CF) application.

17. The medium of claim 10, wherein monitoring the end-to-end communication includes at least one of detecting message buffering, determining connection status, or determining correct message semantics after system updates or downtimes.

18. The medium of claim 10, wherein the first message includes a unique identifier indicating that the first message is used for monitoring the end-to-end communication.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  transmitting, by a first device and to a second device, a first message, wherein the first and second devices are in an Internet of Things (IoT) cloud system, and wherein the first message includes a first timestamp indicating when the first message is transmitted;
  receiving, by the first device and from the second device, a second message, wherein the second message includes the first timestamp and a second timestamp indicating when the first message was received by the second device, and wherein the second message is received at a time indicated by a third timestamp; and
  monitoring, by the first device, end-to-end communication between the first device and the second device in the IoT cloud system based on at least one of the first, second, or third timestamps.

20. The system of claim 19, wherein monitoring the end-to-end communication includes:
  calculating round-trip time (RTT) for the end-to-end communication based on a time difference between the third timestamp and the first timestamp;
  comparing the RTT with a predetermined threshold; and
  in response to determining that the RTT is greater than the predetermined threshold, detecting that at least one of the first message or the second message is delayed during the end-to-end communication.

* * * * *